United States Patent
Inaba et al.

(10) Patent No.: US 6,865,571 B2
(45) Date of Patent: Mar. 8, 2005

(54) DOCUMENT RETRIEVAL METHOD AND SYSTEM AND COMPUTER READABLE STORAGE MEDIUM

(75) Inventors: Yasuhiko Inaba, Yokohama (JP); Katsumi Tada, Kawasaki (JP); Natsuko Sugaya, Kawasaki (JP); Tadataka Matsubayashi, Yokohama (JP); Akihiko Yamaguchi, Yokohama (JP); Mikihiko Tokunaga, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 290 days.

(21) Appl. No.: 09/952,594

(22) Filed: Sep. 13, 2001

(65) Prior Publication Data

US 2002/0073065 A1 Jun. 13, 2002

(30) Foreign Application Priority Data

Oct. 31, 2000 (JP) ........................ 2000-331817

(51) Int. Cl.$^7$ ............................ G06F 17/30; G06F 7/00
(52) U.S. Cl. ........................................................ 707/5
(58) Field of Search ............................... 707/1, 3, 4, 5, 707/6, 10

(56) References Cited

U.S. PATENT DOCUMENTS

| | | | | | |
|---|---|---|---|---|---|
| 5,515,488 A | * | 5/1996 | Hoppe et al. | ................ | 345/440 |
| 5,706,497 A | * | 1/1998 | Takahashi et al. | ............. | 707/5 |
| 5,911,138 A | * | 6/1999 | Li et al. | ........................ | 707/3 |
| 5,940,821 A | * | 8/1999 | Wical | ............................ | 707/3 |
| 5,953,718 A | * | 9/1999 | Wical | ............................ | 707/5 |
| 6,006,222 A | * | 12/1999 | Culliss | .......................... | 707/5 |
| 6,026,388 A | * | 2/2000 | Liddy et al. | .................... | 707/1 |
| 6,081,774 A | * | 6/2000 | de Hita et al. | .................. | 704/9 |
| 6,353,825 B1 | * | 3/2002 | Ponte | ............................ | 707/5 |
| 6,356,899 B1 | * | 3/2002 | Chakrabarti et al. | ........... | 707/5 |
| 6,363,377 B1 | * | 3/2002 | Kravets et al. | ................ | 707/4 |
| 6,546,388 B1 | * | 4/2003 | Edlund et al. | ................. | 707/5 |
| 6,636,848 B1 | * | 10/2003 | Aridor et al. | .................. | 707/3 |
| 6,757,646 B2 | * | 6/2004 | Marchisio | ....................... | 704/8 |

FOREIGN PATENT DOCUMENTS

| | | |
|---|---|---|
| JP | 10-083386 | 3/1998 |
| JP | 10-063685 | 6/1998 |
| JP | 11-143902 | 5/1999 |

OTHER PUBLICATIONS

Toshihiro Suzuki, Takeshi Furuhashi, and Hroaki Tsutsui (2000), A Framework of Fuzzy Modeling Using Generic Algorithms with Appropriate Combination of Evaluation Criteria, pp. 1252–1259.*
N. Kagan and C.C.B. Oliveira (1996) A Fuzzy Constrained Decision Planning Tool to Model Uncertainties in Multiobjective Configuration Problems, pp. 271–275.*
Liren Chen and Katia Sycara (1998), WebMate: A Personal Agent for Browsing and Searching, pp. 132–139.*

* cited by examiner

Primary Examiner—Safet Metjahic
Assistant Examiner—Merilyn Nguyen
(74) Attorney, Agent, or Firm—Townsend and Townsend and Crew LLP

(57) ABSTRACT

A document retrieval method using a computer program includes retrieving a first set of documents using a first query expression generated by the computer program. The first set of documents is provided to a user. An evaluation of the first set of documents is received from the user. The first query expression is changed to a second query expression generated by the computer program based on the evaluation.

7 Claims, 13 Drawing Sheets

FIG.8

| Active user | Seed document | Documents evaluated as useful | Documents evaluated as not useful | Search profile |
|---|---|---|---|---|
| Matsui | 005.txt | Documents 65, 50 | Document 35 | 0005.pfl |

FIG.9

| Search sequence ID | Active user | Seed document | Documents evaluated as useful | Documents evaluated as not useful | Search profile |
|---|---|---|---|---|---|
| 1 | Nishi | 001.txt | Documents 2, 5 | Document 8 | 0001.pfl |
| 2 | Shimizu | 002.txt | Document 10 | Document 35 | 0002.pfl |
| 3 | Etoh | 003.txt | Documents 8, 10, 3 | Documents 1, 70 | 0003.pfl |
| 4 | Shimizu | 004.txt | Documents 68, 71 | Document 3 | 0004.pfl |
| 5 | Matsui | 005.txt | Documents 65, 50 | Document 35 | 0005.pfl |

DOCUMENT RETRIEVAL METHOD AND SYSTEM AND COMPUTER READABLE STORAGE MEDIUM

CROSS-REFERENCES TO RELATED APPLICATIONS

The present application is related to and claims priority from Japanese Patent Application No. 2000-331817, filed on Oct. 31, 2000.

BACKGROUND OF THE INVENTION

The present invention relates to a method and device for retrieving information using a query expression generated based on a feedback from a user.

With the current trend toward intense competition between corporations and organizations, there has been a growing need to share and reuse knowledge and expertise possessed by various individuals in order to improve performance.

For this reason, there has been a growing need for a method to determine who in a corporation or organization has knowledge about particular subject matter (referred to as "Know Who searches"). For example, searches to determine "which person knows about business strategies against company A" may be needed. Two technologies for implementing Know Who searches are described below.

As presented in Japanese laid-open patent publication number 10-63685, the first technology saves query expressions used in past searches using a document retrieval system. Other users can search these saved query expressions to retrieve the names IDs of users who are knowledgeable about the desired information. (This technology is hereinafter referred to as "related art 1").

The following is a description of the flow of operations performed in this technology using the PAD (Problem Analysis Diagram) in FIG. 2. Step 301 in this operation repeats the operations from step 302 through step 309 until the system is shut down. At step 302, input from a user is received. Next, at step 303, if a document retrieval request is entered at step 303, the operations at step 304 through step 306 are performed. First, at step 304, a query expression is received from the user. Next, at step 305, documents are retrieved using the query expression obtained at step 304. Then, at step 306, the query expression obtained at step 304 is saved.

If a query expression search is requested, step 307 executes the operations from step 308 through step 309. First, at step 308, a query expression is received from the user. Next, at step 309, the names of users who used query expressions similar to the query expression obtained at step 308 are taken from the store of query expressions saved at step 306 and displayed.

For example, if the entered query expression is "Retrieve documents containing 'Company A', 'business', and 'strategy'", the names of those who entered similar query expressions in the past can be provided as the retrieval results. This makes it possible to infer who might know about "business strategies against Company A".

As presented in Japanese laid-open patent publication number 10-83386, the second technology (hereinafter referred to as "related art 2"), prior to a user's making a search query, has each user register data (hereinafter referred to as personal profiles) indicating the knowledge and expertise they have. Other users can search the personal profiles to determine who may be knowledgeable about a particular topic. The following is a description of the flow of operations performed in this technology using the PAD shown in FIG. 3.

Step 401 in this process repeats the operations from step 402 through step 408 until the system is shut down. At step 402, input from a user is received. At step 403, if the input is determined to be a know-how or knowledgeability registration request, the operations from step 404 through step 405 are performed. At step 404, input about the user's expertise is received from the user, and, at step 405, the knowlegeability data received at step 404 is saved.

At step 406, if the input is a request for a knowlegeability search, the operations from step 407 through step 408 are performed. At step 407, a query expression is received from the user. Next, at step 408, the knowledgeability data saved at step 405 is searched based on the query expression obtained at step 407, and the names of the users who registered the retrieved knowledgeability data are presented.

For example, users who know about "business strategies against Company A" enter strings such as "Company A" and "business" into their personal profiles before performing a search. Then, another user can search personal profiles using a query expression such as "Company A" and "business" to obtain the name of the user who entered these terms. As a result, it can be inferred that the person registering this personal profile knows about "business strategies against Company A".

However, in related art 1, similar query expressions used in the past will be presented as retrieval results regardless of whether or not desired retrieval results could be obtained. Thus, it is possible for the results to include users who entered inappropriate query expressions that did not result in desired documents being retrieved.

For example, the query expression "retrieve documents containing 'Company B', 'business', and 'strategy'" may be retrieved in response to the query expression "retrieve documents containing 'Company A', 'business', and 'strategy'" due to two of the terms in the query expression matching. As a result, a user who knows "business strategies against Company B" may be retrieved rather than a user knowing "business strategies against Company A".

In related art 2, users are burdened with having to prepare personal profiles beforehand, and only a topic of expertise that was registered can be used. Also, the users may not necessarily be able to prepare an adequate personal profile.

For example, each time a user obtains knowledgeability data such as "business strategies against Company A", the user must register strings such as "Company A" and "business". The strings "Company A" and "business," alone, cannot express what the relation of business is to Company A in the registered knowlegeability data. Thus, it is not necessarily possible to register adequate personal profiles.

BRIEF SUMMARY OF THE INVENTION

The present invention overcomes the problems described above and provides a means for allowing a user to register information about what he or she knows without imposing a burden on the user, and a means for retrieving, in an appropriate manner, information about which users know which information.

In one embodiment, a document retrieval method using a computer program includes retrieving a first set of documents using a first query expression generated by the computer program. The first set of documents is provided to a user. An evaluation of the first set of documents is received from the user. The first query expression is changed to a second query expression generated by the computer program based on the evaluation.

In another embodiment, a document retrieval method retrieving registered documents includes: a step for receiving from a user an evaluation of at least one document obtained as a document retrieval result, the evaluation stating whether or not the document is useful; a step for changing the query expression so that the weights of query terms in the documents evaluated as useful are increased, and the weights of query terms in the documents evaluated as not useful are decreased; a step for repeating document retrieval using the changed query expression and evaluation entry; and a step for storing, in a storage means, a search history in the form of the identifier of a document evaluated as useful by the user along with the identifier of the user. According to another aspect, a document retrieval method can also include a step for storing a final query expression in the search history, with these features.

According to a further aspect of the present invention, a document retrieval method is provided wherein the search history is searched using at least one document identifier as a key, and a record from the search history containing a matching document identifier is obtained and displayed.

In another aspect of the present invention a document retrieval method is provided wherein the search history is searched using a specified query expression, and a record from the search history containing a query expression similar to the specified query expression is obtained and displayed.

The objects described above can also be achieved using a program implementing the functions described above or by using a recording medium storing such a program.

BRIEF DESCRIPTION OF THE DRAWINGS

FIG. 8 shows an example of information stored in a feedback history retrieval file in an embodiment of the present invention.

FIG. 9 shows an example of how information is added to a search sequence storage file by a search sequence storage program in an embodiment of the present invention.

DETAILED DESCRIPTION OF THE INVENTION

The embodiments of the present invention are now described in conjunction with the drawings.

Figure 1:
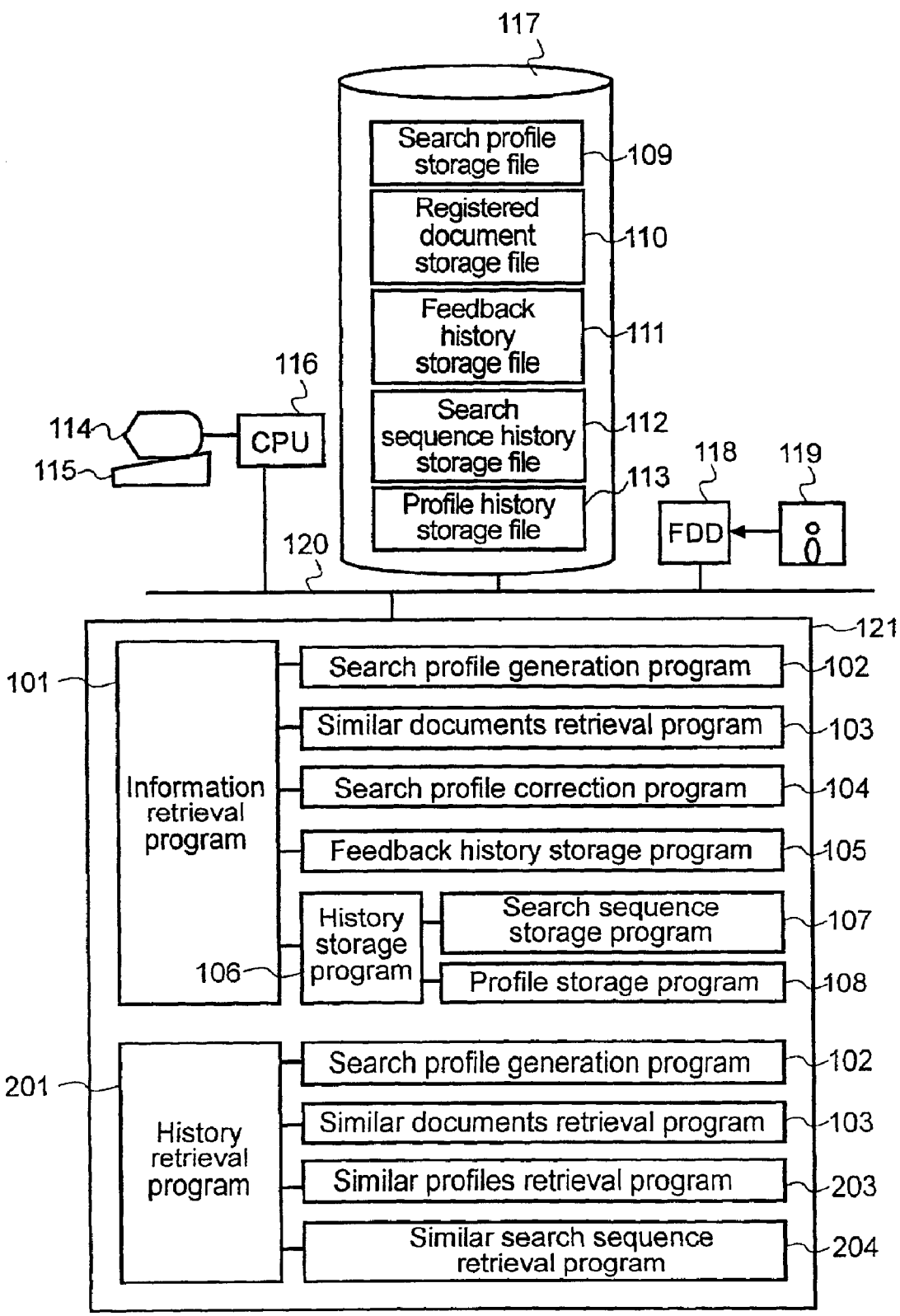
FIG. 1 is a block diagram of the architecture of an embodiment of the present invention.

FIG. 1 shows the system architecture of an embodiment of the present invention. The system according to this embodiment is a computer that comprises: a display 114, a keyboard 115, a central processing unit (CPU) 116, a magnetic disk device 117, a floppy disk drive (FDD) 118, a main memory 121, and a bus 120 connecting these elements.

Magnetic disk device 117 is a secondary storage device and stores a search profile storage file 109, a registered documents storage file 110, a feedback history storage file 111, a search sequence storage file 112, and a profile history storage file 113. Information stored in a floppy disk 119 is read into main memory 121 or magnetic disk device 117 by way of a floppy disk drive 118.

Main memory 121 stores an information retrieval program 101 and a history retrieval program 201. Information retrieval program 101 includes: a search profile generation program 102; a similar documents retrieval program 103; a search profile correction program 104; a feedback history storage program 105; and a history storage program 106. History storage program 106 includes a search sequence storage program 107 and a profile storage program 108.

History retrieval program 201 includes: a search profile generation program 102; a similar documents retrieval program 103; a similar profiles retrieval program 203; and a similar search sequence retrieval program 204. In one embodiment, search profile generation program 102 and similar documents retrieval program 103 here are identical to the search profile generation program 102 and the similar documents retrieval program 103 from information retrieval program 101.

Display 114 is a display device for displaying guide screens for entering query expressions and retrieval results. Keyboard 115 is an input device for entering query expressions and other instructions. In the system architecture of FIG. 1, display 114 and keyboard 115 are connected to a "retrieval server", and used to access the r server through display 114 and keyboard 115. However, it would also be possible to have a client-server system where a client terminal equipped with display 114 and keyboard 115 accesses the retrieval server by way of a network.

Information retrieval program 101 and history retrieval program 201 are stored on a recording medium such as floppy disk 119, and a drive such as floppy disk drive 118 is used to load the programs into main memory 121 so that they can be executed by CPU 116.

Figure 2:
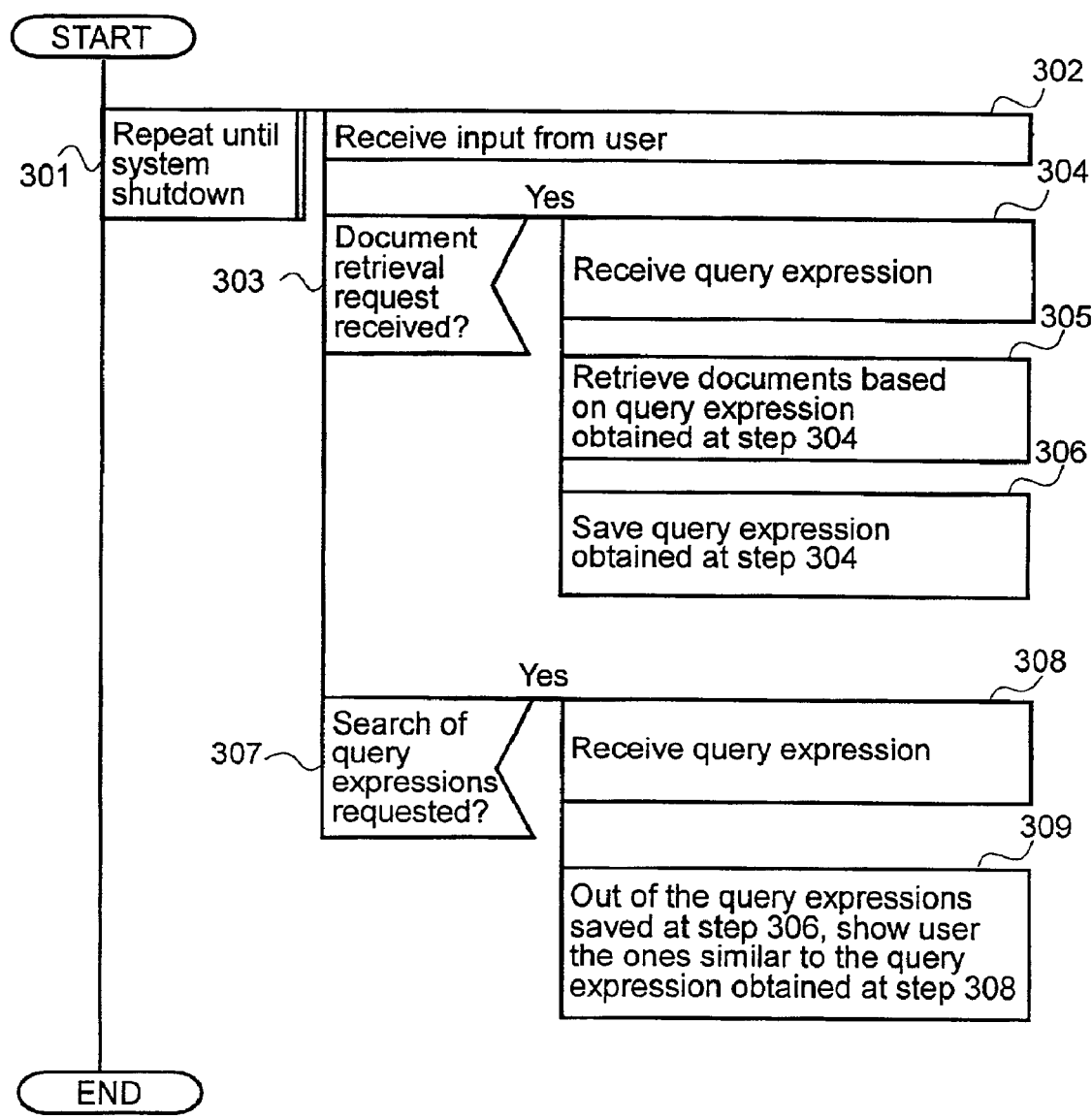
FIG. 2 is a PAD drawing showing the flow of operations performed in related art 1.
Figure 3:
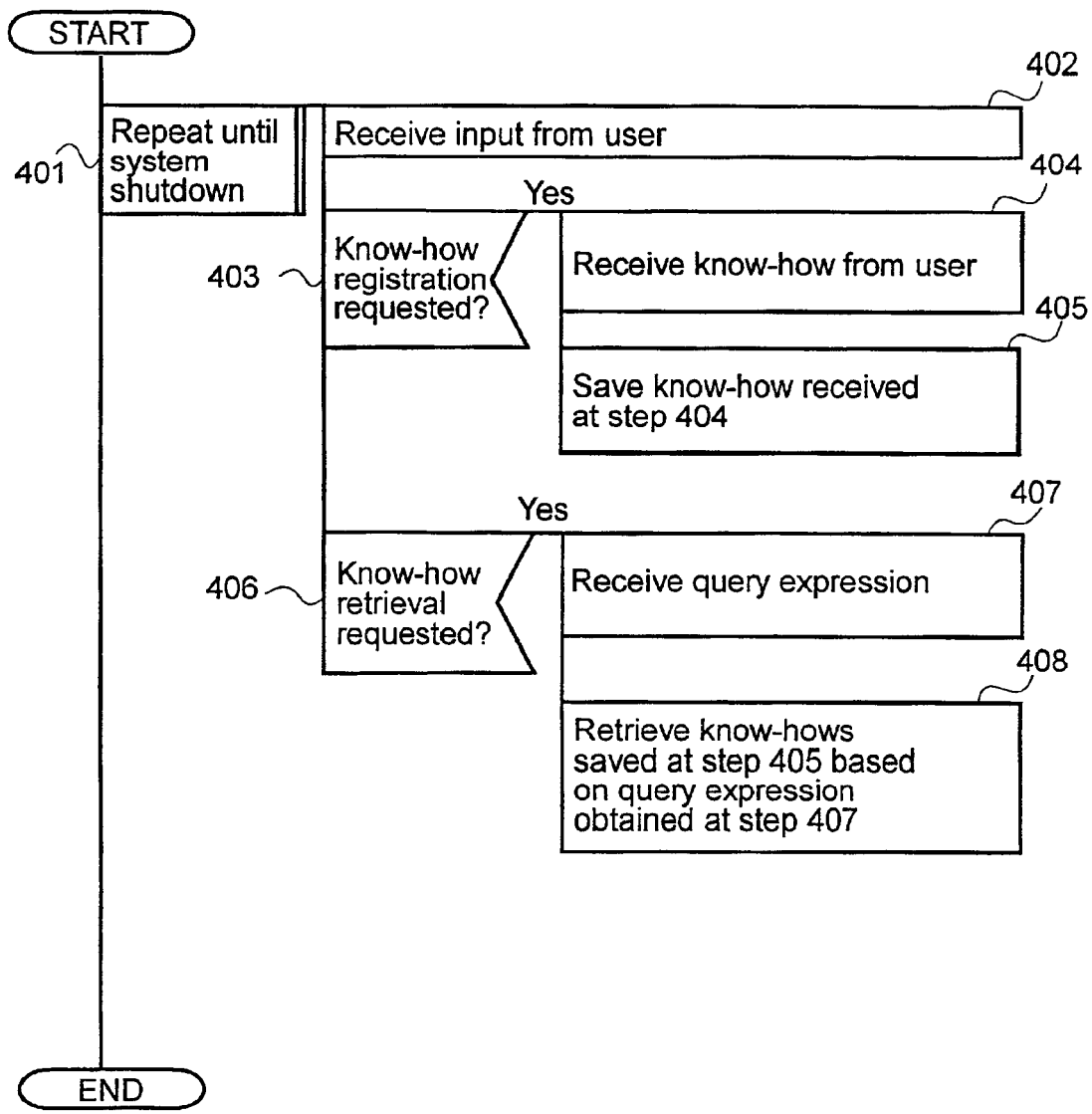
FIG. 3 is a PAD drawing showing the flow of operations performed in related art 2.
Figure 4:
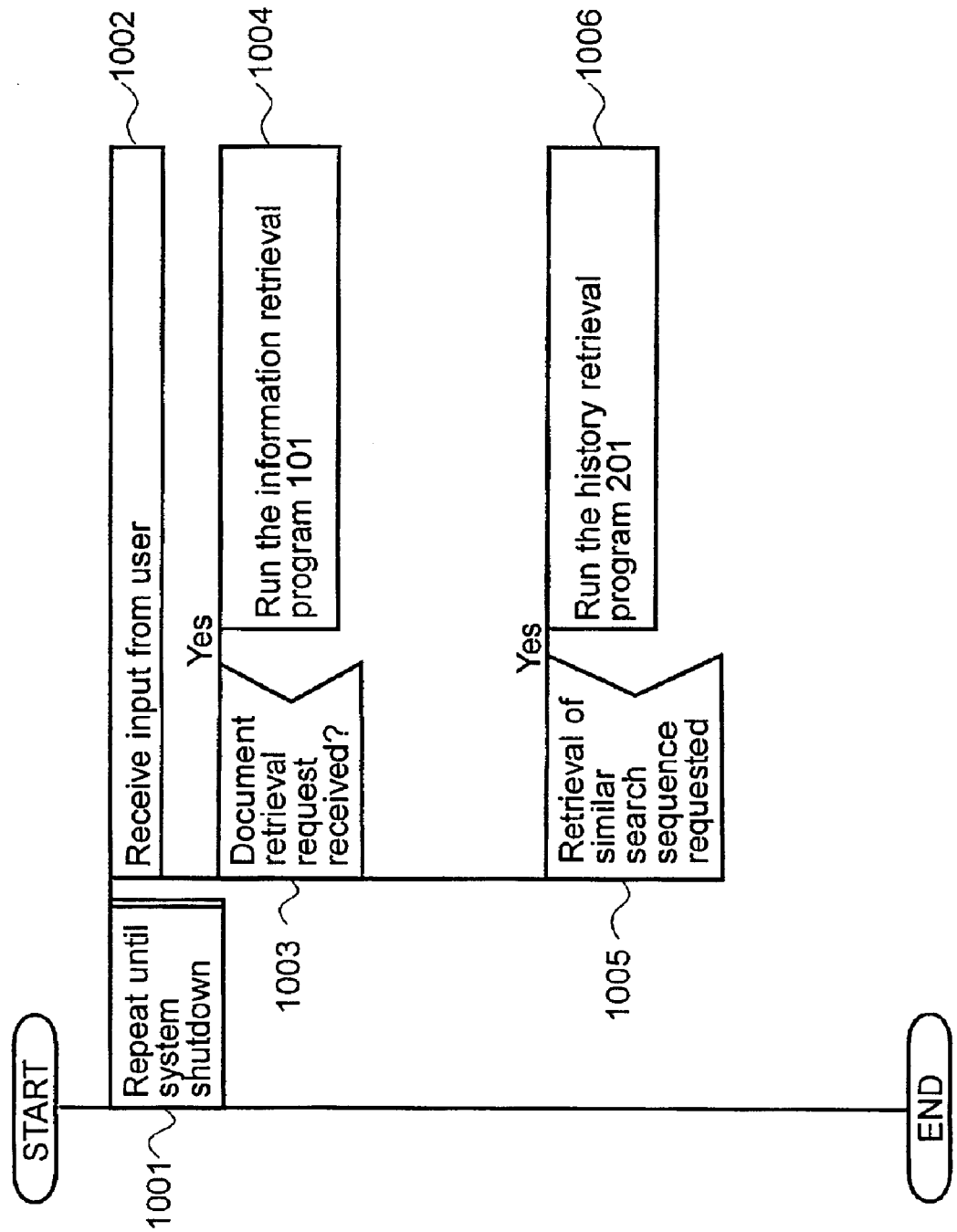
FIG. 4 is a flow chart of operations performed in an embodiment of the present invention.

Next, the overall flow of operations in this embodiment are now described with reference to FIG. 4. In this embodiment, information retrieval program 101 is executed at step 1004 in place of steps 304–306 of the related art shown in FIG. 2. Also, history retrieval program 201 is executed at step 1006 in place of steps 308–309.

Figure 5:
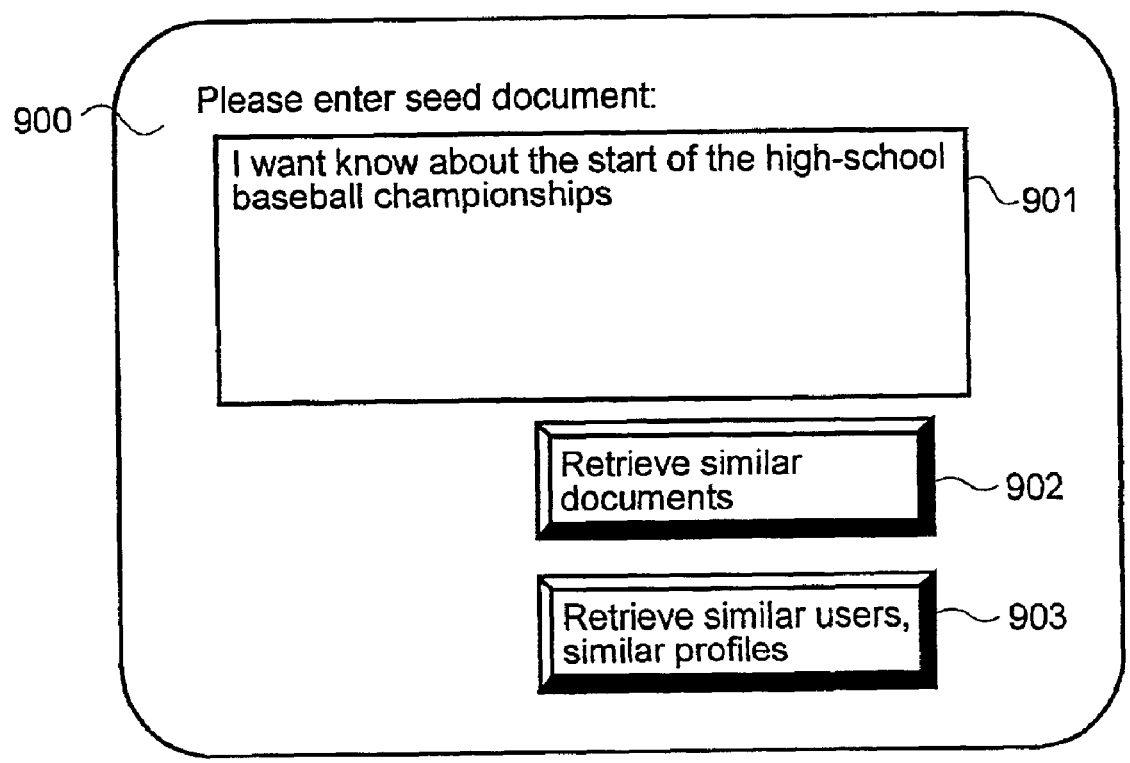
FIG. 5 shows an example of an initial screen displayed in an embodiment of the present invention.

Using screen 900 shown in FIG. 5, the user decides whether to retrieve document information using information retrieval program 101 or to retrieve past search sequences using history retrieval program 201. When a seed document is entered in a text box 901 and a "retrieve similar documents" button 902 is pressed, information retrieval program 101 is executed and documents similar to the seed document are retrieved. Similarly, if a "retrieve similar users, similar profiles" button 903 is pressed, history retrieval program 201 is executed and similar search sequences are retrieved.

In this embodiment, step 1001 repeats the operations from step 1002 to step 1006 until the system is shut down. At step 1002, input from the user is received. Next, at step 1003, if the input from the user is determined to be a request to retrieve similar documents, information retrieval program 101 is executed at step 1004. At step 1005, if the user input is determined to be a request to retrieve similar search sequences, history retrieval program 201 is executed at step 1006.

The following is a description of information retrieval program 101 executed at step 1004. Information retrieval program 101 includes similar documents retrieval program 103, which selects registered documents similar in content to the document entered by the user (hereinafter referred to as the "seed document") and displays the results to the user. Also, similar documents retrieval program 103 is equipped with a relevance feedback feature, where the user evaluates the retrieval results and performs another retrieval based on this evaluation. The series of operations that starts with the user entering the seed document, repeating the relevance feedback operations, and ending the retrieval operations will be referred to as the "search sequence."

Figure 6:
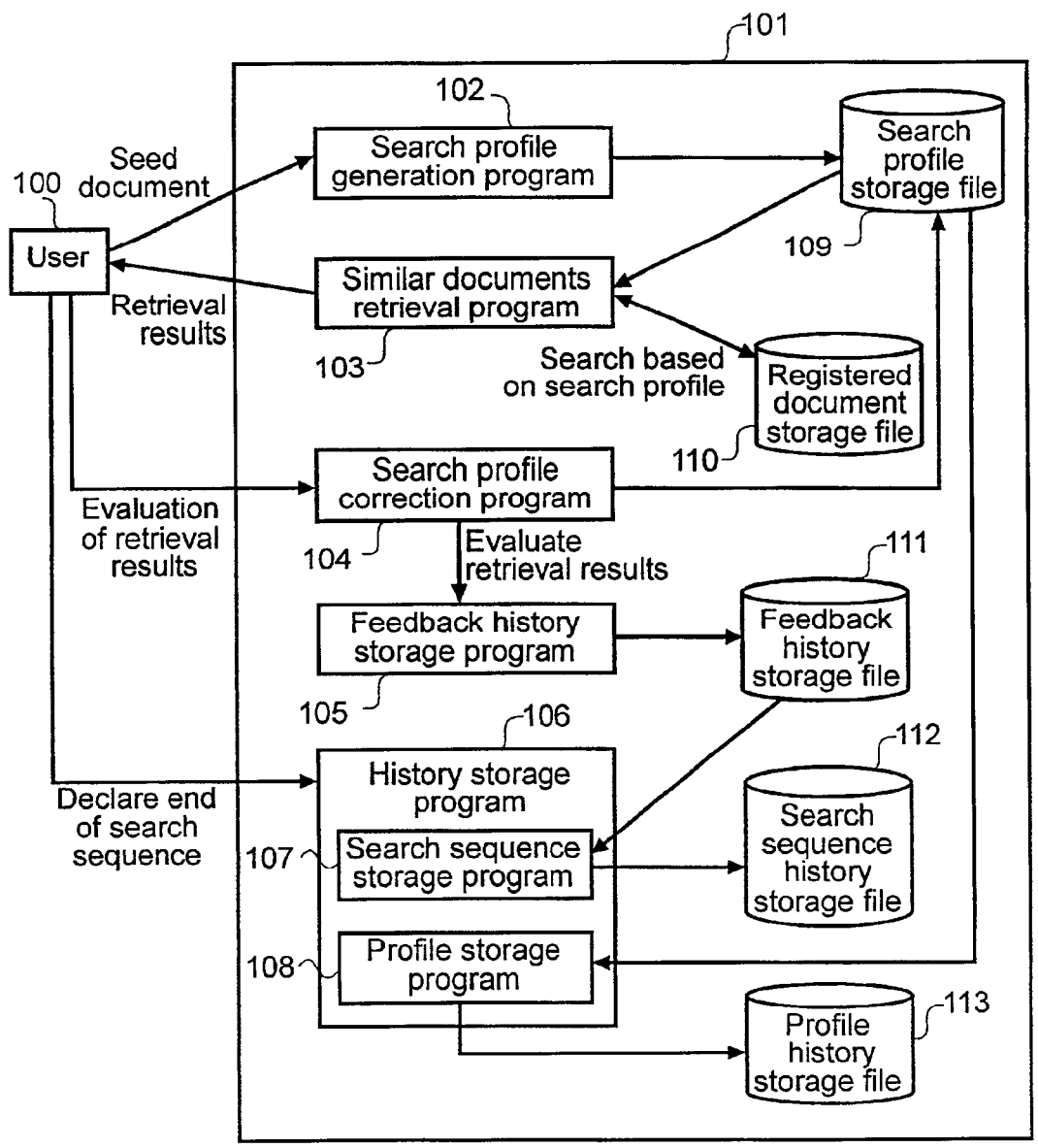
FIG. 6 is a block diagram of the architecture of a information retrieval program in an embodiment of the present invention.

FIG. 6 shows the architecture of information retrieval program 101 according to the present invention.

Information retrieval program 101 includes: search profile generation program 102; similar documents retrieval program 103; search profile correction program 104; feedback history storage program 105; and history storage program 106. The accessed files are search profile storage file 109, registered documents storage file 110, feedback history retrieval file 111; search sequence storage file 112, and profile history storage file 113. History storage program 106 includes search sequence storage program 107 and profile storage program 108, which are described below.

First, search profile generation program 102 receives query expressions from a user 100 and generates data (hereinafter referred to as the "search profile") that has as an element the content to be retrieved by user 100.

This program receives the seed document entered by user 100. Using this seed document, a search profile is generated and written to search profile storage file 109. This search profile serves as the query expression.

Figure 7:
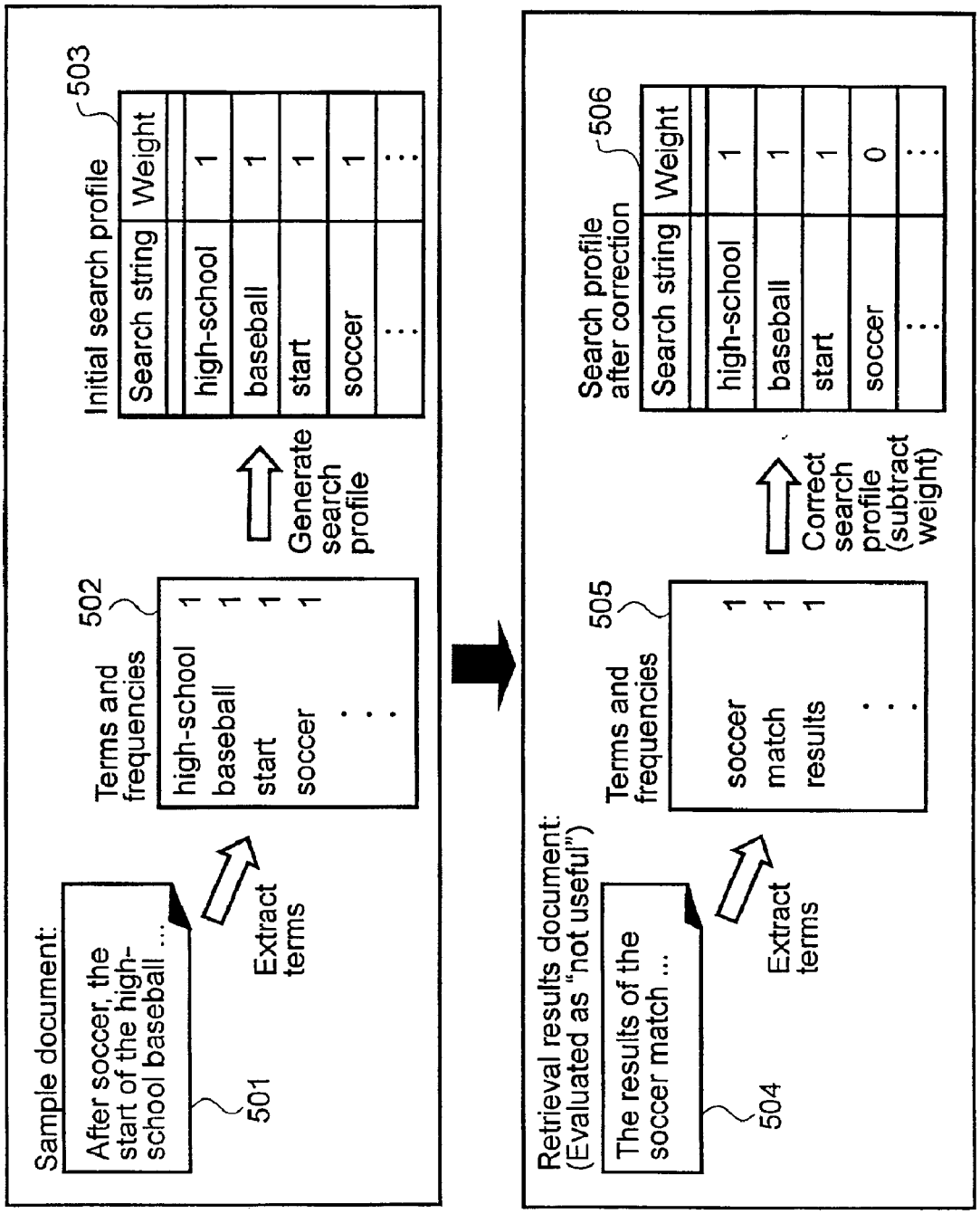
FIG. 7 shows an example of a method for generating search profile contents in an embodiment of the present invention.

An example of search profile contents and a generation method is described with reference to FIG. 7. User 100 enters a document that includes "After soccer, the start of the high-school baseball . . . " as a seed document 501. At this point, search profile generation program 102 extracts one or more search term strings (hereinafter referred to as characteristic strings) that may be independent terms from seed document 501. Frequency of occurrence in seed document 501 is calculated for each characteristic string, to serve as a weight value to be used in similar document retrievals. The extracted characteristic strings and their weights are written to a search profile 503. The similar documents retrieval program 103 assigns a conceptual score to each of the documents registered in the registered documents storage file 110, based on the degree of similarity to the specified seed document. Documents with high degrees of similarity are displayed to user 100 as the retrieval results.

This program calculates degrees of similarity for the documents stored in registered documents storage file 110 based on the search profiles stored in search profile storage file 109 and displays at least one document with a high degree of similarity to user 100.

The degree of similarity is calculated using Expression 1, shown below.

$$S(D) = \sum_{i}^{N} \{Frq(i) \times w(i)\} \qquad \text{[Expression 1]}$$

In this expression, S(D) represents the similarity of a document D in registered documents storage file 110, Frq (i) represents the frequency of occurrence in document D of a term i from the seed document in document D, w(i) is the weight of the term i in search profile storage file 109, i.e., the occurrence frequency of the term i in the seed document. The similarity calculation can also use other variables. Search profile correction program 104 corrects the contents of the search profile based on a user-entered evaluation of whether or not the indicated retrieval results document is useful. This program receives the document evaluated by user 100, and the evaluation, and based on this evaluation, search profile stored in the search profile storage file 109 is corrected.

The search profile correction method is now described with reference to FIG. 7. In the example in this figure, a document 504 containing "The results of the soccer match . . . " is presented to user 100 as the retrieval result, and user 100 evaluates this document as "not useful." As in search profile generation program 102, the correction program extracts characteristic terms and their occurrence frequencies 505 from document 504. Then, these occurrence frequencies 505 are subtracted from the weights of the corresponding strings in search profile 503. As a result, the contents of search profile 503 are corrected to show the contents of search profile 506. The occurrence frequencies of matching strings are decreased since the document is not useful to the user. This indicates that the string matches were incidental, and since these strings can be assumed not to be of interest to the user, their weights are reduced. As a result of the subtraction operation, the weight is a negative number or zero.

For documents evaluated as useful, the occurrence frequencies 505 are added to the weights of the corresponding strings in search profile 503. The user can execute the similar documents retrieval program 103, based on the corrected search profile, to perform another retrieval operation on registered documents storage file 110. By following the procedure described above and using the results of this second retrieval, the user can again execute search profile correction program 104 to correct search profile storage file 109. Thus, by repeating the relevance feedback in this manner, the documents sought by the user can be narrowed down.

Feedback history storage program 105 saves relevance feedback history when user 100 performs relevance feedback. This program adds the identifier of the document evaluated by user 100 and the document evaluation to the feedback history retrieval file 111. As user 100 repeats relevance feedback and performs multiple retrievals, the identifiers and evaluations of those documents are added.

FIG. 8 shows an example of information stored in feedback history retrieval file 111. In this example, the user "Matsui" enters a document with the filename "005.txt" as the seed document. The user performs relevance feedback, and documents 65 and 50, obtained through retrievals, are evaluated as "useful," and document 35 is evaluated as "not useful". A search profile saved under the filename "0005.pfl" is used in these operations, and the contents of this search profile are corrected with each relevance feedback operation.

Next, search sequence storage program 107 and profile storage program 108 of history storage program 106 are described with reference to FIG. 9. Search sequence storage program 107 adds the series of evaluated documents and their evaluations to search sequence storage file 112 when user 100 has repeatedly performed relevance feedback and completed the retrieval operation.

This program executes when a declaration of the completion of a search sequence, e.g., a logout instruction, has been received. The information stored in feedback history retrieval file 111 is read and the contents are added to search sequence storage file 112. In the example shown in FIG. 9, search sequences assigned search sequence IDs (identifiers) 1–4 have been performed and completed. The entry in the last row of the figure has been added and assigned a search sequence ID of 5. Each row in search sequence storage file 112 indicates a record of the final results obtained by the corresponding search sequence.

Profile storage program 108 saves the search profile that has been corrected and refined as a result of repeated relevance feedback operations by user 100.

This program executes when a declaration from user 100 indicates that a search sequence has been completed. Information stored in search profile storage file 109 is read and the contents are stored in profile history storage file 113. The contents of profile history storage file 113 is an accumulation of search profile storage file 109 for all the users, i.e., search profiles 506 after correction.

As described later, search sequence storage file 112 and profile history storage file 113 are used for retrievals in which a user uses history retrieval program 201 to find out whether someone has made similar searches in the past.

The strings to be written by search profile generation program 102 to search profile storage file 109 can be all the extracted characteristic strings. Alternatively, a predetermined number of extracted characteristic strings having the highest occurrence frequencies in the seed document can be used. The characteristic strings can be extracted using the method described in Japanese laid-open patent publication number 11-143902, a method involving extracting of terms from documents using morphological analysis, or the like.

Figure 10:
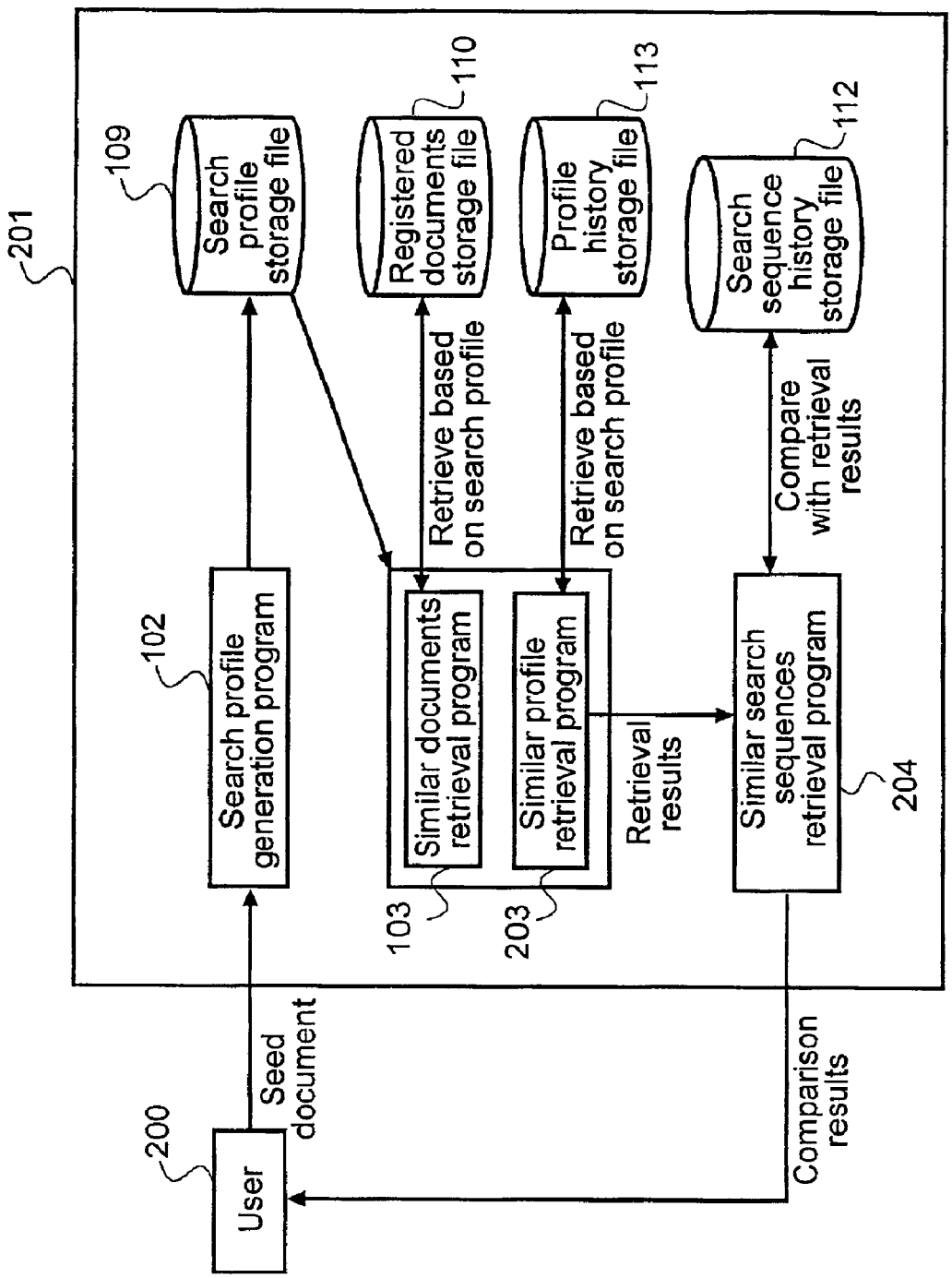
FIG. 10 is a block diagram showing an architecture of a history retrieval program in an embodiment of the present invention.

Next, history retrieval program 201 executed at step 1006 is described with reference to FIG. 10, which shows the architecture of the program according to this embodiment.

History retrieval program 201 searches the history of past retrievals made using information retrieval program 101. As a result, information about users with similar interests can be obtained, and past query expressions entered into information retrieval program 101 can be obtained and re-used.

History retrieval program 201 according to this embodiment includes: search profile generation program 102; similar documents retrieval program 103; similar profiles retrieval program 203; and similar search sequence retrieval program 204.

The following files are accessed: search profile storage file 109; registered documents storage file 110; profile history storage file 113; and search sequence storage file 112.

Search profile generation program 102, similar documents retrieval program 103, search profile storage file 109, registered documents storage file 110, profile history storage file 113, and search sequence storage file 112 are identical to the programs and files described with regard to information retrieval program 101. According to one embodiment, they are shared by information retrieval program 101 and history retrieval program 201, and are described below.

Search profile generation program 102 creates a search profile from the seed document entered by a user 200 for use in history retrievals. The operations performed by this program have been described above.

Similar documents retrieval program 103 obtains documents with high degrees of similarity by assigning conceptual scores based on the degree of their similarity to the specified seed document. As described later, the documents obtained in this manner are used to make comparisons with documents recorded in the relevance feedback history provided by users who had performed prior retrievals. For example, a user who had indicated a document obtained here as "useful" can be assumed to have a similar retrieval interest (objective) as the user performing the history retrieval.

This program calculates the degree of similarity of documents stored in registered documents storage file 110 based on the search profiles stored in search profile storage file 109. Then, identifiers of documents having similarities exceeding a fixed threshold are provided as retrieval results.

The similar profiles retrieval program 203 retrieves past search profiles similar to a generated search profile based on the seed document entered by user 200.

This program calculates degrees of similarity of search profiles stored in profile history storage file 113, based on the search profiles stored in search profile storage file 109. Then, the program obtains the identifiers of search profiles having degrees of similarity that exceed a fixed threshold. The method used to calculate similarities can be the same as the method used in similar documents retrieval program 103 or can be a different method.

The similar search sequence retrieval program 204 extracts past search sequences with similar retrieval interests (objectives), based on retrieval results from similar documents retrieval program 103 and similar profiles retrieval program 203.

First the program obtains the retrieval results from similar documents retrieval program 103 and similar profiles retrieval program 203. Then, comparisons are made with past search sequences stored in the search sequence storage file 112, and the results of this comparison are presented to user 200 in the form of similar search sequences.

Figure 11:
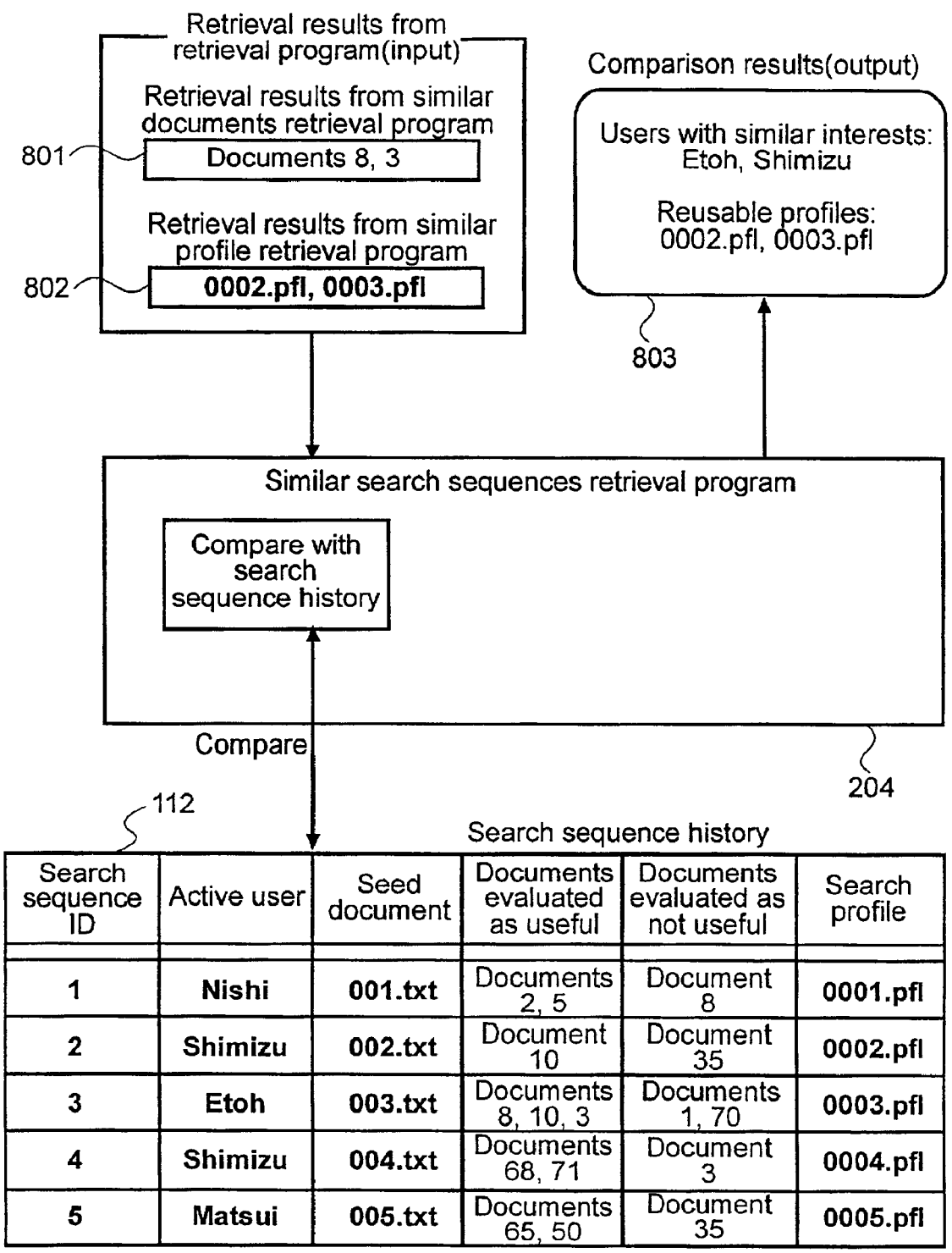
FIG. 11 shows an example of how a similar search sequence retrieval program compares a query expression and saved search sequence histories in an embodiment of the present invention.

FIG. 11 shows an example of the comparison operation where a document 8 and a document 3 are obtained as a retrieval result 801 from the similar documents retrieval program 103.

Two profiles, 0002.pfl and 0003.pfl are also obtained as a retrieval result 802 from the similar profiles retrieval program 203. From search sequences stored in search sequence storage file 112, similar search sequence retrieval program 204 extracts the entries in which retrieval results 801 are contained in the "documents evaluated as useful" field and entries in which retrieval results 802 are contained in the "search profile" field. In this case, document 3 and document 8 are included in the "documents evaluated as useful" field under search sequence ID 3, and 0002.pfl is included in the "search profile" field under search sequence ID 2. Thus, search sequence ID 3 and search sequence ID 2 are determined to be similar search sequences, and the user performing the history retrieval is presented with the name of the user who generated these sequences and the profiles that were used.

In the example above, the inclusion of retrieval results 801 or retrieval results 802 is sufficient to identify sequences as similar. However, other methods can be used. For example, sequences may not be identified as similar unless a predetermined number of results are included, or unless the degree of similarity exceeds a predetermined threshold value.

A profile can also be created to represent concepts not useful to the user performing the history retrieval, and degrees of similarity with documents evaluated as not being useful can be used as well. It would also be possible to have at least one document identifier entered as a query expression and to use this document identifier as a key to search the search sequence storage file 112 so that records containing the specified document identifier as a "document evaluated as being useful" can be extracted and displayed.

Figure 12:
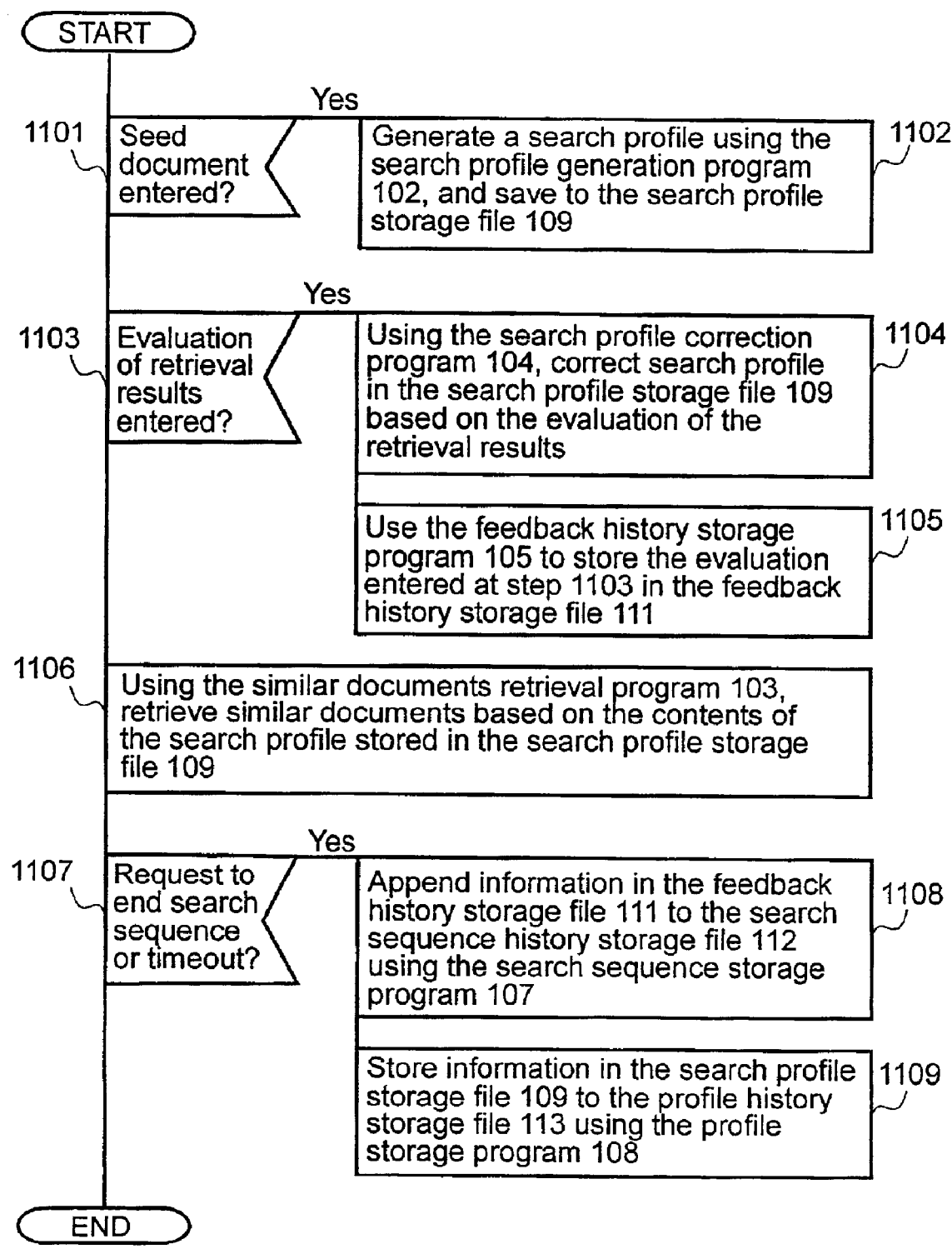
FIG. 12 is a flowchart of operations performed by a information retrieval program in an embodiment of the present invention.

Referring now to FIG. 12, the flow of operations performed by information retrieval program 101 executed at step 1004 is described. First, if step 1101 determines that a seed document has been entered, step 1102 is executed. At step 1102, search profile generation program 102 is used to generate a search profile, which is stored in search profile storage file 109. Next, if step 1103 determines that an evaluation of a retrieval result was entered, step 1104 and step 1105 are executed. At step 1104, search profile correction program 104 is used to correct the contents of the search profile stored in search profile storage file 109, based on the evaluation of the retrieval results. At step 1105, feedback history storage program 105 is used to save the evaluation entered at step 1103 to feedback history retrieval file 111.

Next, at step 1106, similar documents retrieval program 103 retrieves similar documents based on the search profile stored in search profile storage file 109. At step 1107, if a request to end to the search sequence is received or if a timeout occurs, steps 1108 and 1109 are executed. At step 1108, search sequence storage program 107 adds information in the feedback history retrieval file 111 to the search sequence storage file 112. At step 1109, profile storage program 108 saves the information in search profile storage file 109 to profile history storage file 113. Thus, step 1107 corresponds to the step for extracting search sequences, and steps 1108 and 1109 correspond to steps that save the extracted search sequence history.

The operations described above allow a user to retrieve similar documents using relevance feedback. Information indicating what kind of relevance feedback was performed and the search profile that was refined through relevance feedback can be saved at the end of a search sequence.

Figure 13:
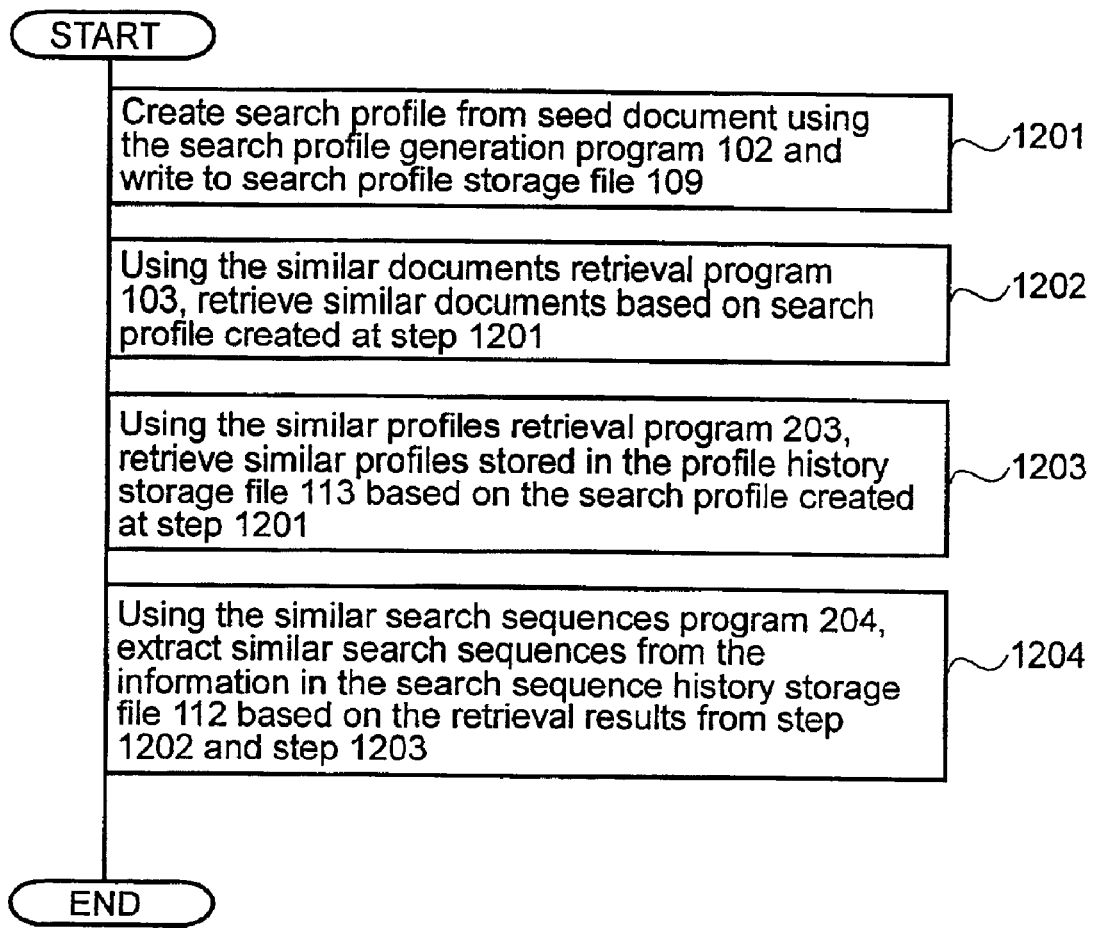
FIG. 13 is a flowchart of operations performed by a history retrieval program in an embodiment of the present invention.

Next, the flow of operations performed by history retrieval program 201 executed at step 1006 is described with reference to FIG. 13. First, at step 1201, search profile generation program 102 generates a search profile from the seed document and writes it to search profile storage file 109. Next, at step 1202, similar documents retrieval program 103 retrieves similar documents based on search profile generated at step 1201.

At step 1203, similar profiles stored in profile history storage file 113 are retrieved, based on the search profile generated at step 1201. Next, at step 1204, similar search sequence retrieval program 204 extracts similar search sequences from information in the search sequence storage file 112, based on the retrieval results from steps 1202 and 1203. These extracted sequences are presented to the user. The method used to extract similar search sequences is the same as the method described above for similar search sequence retrieval program 204.

Figure 14:
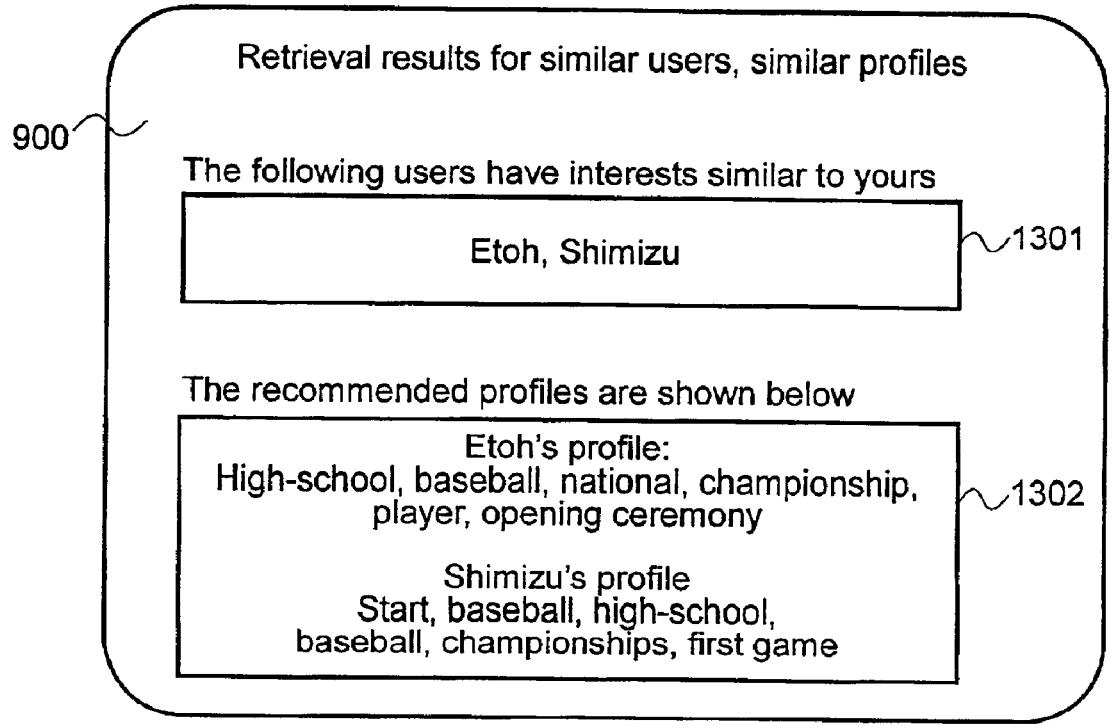
FIG. 14 is an example of a screen where a similar search sequence retrieval program presents retrieval results in an embodiment of the present invention.

FIG. 14 shows an example of the information presented to the user in this operation. In FIG. 14 a screen showing the results from history retrieval program 201 is displayed when a seed button is entered in text box 901 of FIG. 5, and the "retrieve similar users, similar profiles" button 903 is pressed. In the example, the user names "Etoh" and "Shimizu" are displayed in display area 1301 as the users who performed prior retrievals based on similar interests. The search profiles created and corrected as a result of the retrievals performed by these users are displayed in display area 1302.

Based on this information, the user can determine that "Etoh" and "Shimizu" may know about the sought information, and the user can ask these people for the information.

Once the search profiles are presented, retrievals can be performed using these as input, or the strings contained in the displayed search profiles can be used along with the user's own seed documents or search profiles to perform retrievals.

The operations described above enable user to find out which other users have knowledge of a particular topic. Moreover, retrieval know-how, in the form of search profiles refined through relevance feedback, can be obtained and reused.

In this embodiment of the present invention, the user enters a seed document to serve as a query expression and retrieves similar documents. However, it would also be possible to use a series of terms linked by Boolean conditions to perform retrievals.

Further, in this embodiment of the present invention, when the user ends a search sequence the history is stored in search sequence storage file 112. However, it would also be possible to rewrite the contents of search sequence storage file 112 each time a user enters an evaluation during a search sequence. In this case, currently active search sequences can also be searched by similar search sequence retrieval program 204.

In addition, it would be possible to use the present invention in a document information distribution system where query expressions are registered and document information matching the expressions would be sent to users. In this type of document information distribution system, relevance feedback is saved for the search profile registered by each user. These histories are searched using the similar search sequence retrieval program 204, and the search profiles of users having similar interests can be extracted.

The input of evaluations to the retrieval results can be performed by having a user enter an evaluation for individual retrieval result documents one at a time. Alternatively, a user can enter evaluations all at once for multiple search result documents. In this embodiment, evaluations are either "useful" or "not useful". However, it would also be possible to have multi-level evaluations using categories such as "somewhat useful" or "completely not useful".

According to the present invention as described above, histories of individual search sequences are managed by associating the histories of relevance feedback operations performed by individual users with the query conditions corrected through the relevance feedback operations.

This process allows the histories of trial-and-error searches performed by users to be automatically saved along with personal profiles containing query expressions refined through the trial-and-error searches. As a result, information relating to "what a particular user knows" can be registered without placing a burden on individual users.

Moreover, the accumulated trial-and-error searches and query expressions can be searched by other users. This allows information relating to "who knows this information" to be retrieved in an appropriate manner.

Although the present invention has been described in terms of a specific embodiment, the invention is not limited to this specific embodiment. The invention, however, is not limited to the embodiment depicted and described. Rather, the scope of the invention is defined by the appended claims.

What is claimed is:

1. A document retrieval method using a computer program, wherein the computer program is run to initiate a first search session, the method comprising:

receiving a document provided by a first user;

generating first search criteria using the computer program based on the document provided by the user, the first search criteria having one or more search expressions and one or more weights for the search terms;

retrieving a first set of documents using the first search criteria for user review;

receiving from the first user an evaluation of a document included within the first set of documents, the evaluation indicating whether the document is useful or not;

generating second search criteria using the computer program by altering the search term weight of the first search criteria if the document is indicated to be not useful by the user, wherein the search term weight may increase or decrease according to the evaluation;

retrieving a second set of documents using the second search criteria; and storing as a search history record in a search history storage file, an identifier of a document evaluated as being useful by the user and an identifier of the first user.

2. The document retrieval method of claim 1, wherein the search history record includes final query criteria used before terminating the search session.

3. The document retrieval method of claim 1, further comprising:

searching the search history file using at least one document identifier as a key; and displaying a search history record from the search history file that includes a document identifier that matches the at least one document identifier.

4. The document retrieval method of claim 2, further comprising:

searching the search history file using input search criteria; and displaying a search history record from the search history file that includes search criteria that is similar to the input search criteria.

5. The document retrieval method of claim 1, wherein the computer program is run to initiate a second search session, the method further comprising:

receiving from a second user an evaluation for a document retrieved with a third search criteria using the computer program;

generating fourth search criteria using the program based on the evaluation by the second user; and searching the search history storage file using the fourth search criteria to retrieve a record that is deemed to be relevant to the second search session.

6. The document retrieval method of claim 5, wherein the record that is deemed to be relevant to the second user includes an identification of a past user who had conducted a search for similar information.

7. The document retrieval method of claim 2, further comprising:

receiving from a second user an evaluation for a document retrieved with third search criteria using the computer program;

generating fourth search criteria using the program based on the evaluation by the second user; and searching the search history storage file using the fourth search criteria to retrieve a record that is deemed to be relevant to the second user, wherein the record that is deemed to be relevant to the second user includes search criteria used in a previous search session that are similar to the fourth search criteria.

* * * * *